United States Patent [19]

Berthold, III et al.

[11] 4,413,879

[45] Nov. 8, 1983

[54] METHOD AND APPARATUS FOR SIDE LAUNCH EXCITATION OF SELECTED MODES IN GRADED-INDEX OPTICAL FIBERS

[75] Inventors: John W. Berthold, III, College Park; Paul S. Szczepanek, Highland, both of Md.

[73] Assignee: The United States of America as represented by the director of the National Security Agency, Washington, D.C.

[21] Appl. No.: 85,137

[22] Filed: Oct. 15, 1979

[51] Int. Cl.³ ............................................... G02B 5/172
[52] U.S. Cl. ................................. 350/96.19; 350/320
[58] Field of Search .................. 350/96.15, 96.19, 320

[56] References Cited

U.S. PATENT DOCUMENTS

| | | | |
|---|---|---|---|
| 3,610,727 | 10/1971 | Ulrich | 350/96.19 |
| 3,777,149 | 12/1973 | Marcatili | 350/96.15 |
| 3,933,455 | 1/1976 | Chown | 350/96.15 |
| 4,060,308 | 11/1977 | Barnoski et al. | 350/96.15 |
| 4,125,768 | 11/1978 | Jackson et al. | 350/96.19 |

OTHER PUBLICATIONS

H. P. Hsu et al., "Single Mode Optical Fiber Pickoff Coupler" in *Applied Optics*, vol. 15, No. 10, Oct. 1976.

*Primary Examiner*—John D. Lee
*Attorney, Agent, or Firm*—Thomas O. Maser; John R. Utermohle

[57] ABSTRACT

An optical fiber having a parabolic-index profile is etched to a taper below the cladding layer. A prism contacts the taper along its length within the etched portion of the fiber, and coherent light is transmitted through the prism into the fiber. Selective control of the light beam entry angle, entry position along the taper, and control of the etching depth allows excitation of specific modes within the fiber and maximization of coupling efficiency.

7 Claims, 3 Drawing Figures

METHOD AND APPARATUS FOR SIDE LAUNCH EXCITATION OF SELECTED MODES IN GRADED-INDEX OPTICAL FIBERS

BACKGROUND OF THE INVENTION

1. Field of the Invention

This invention relates to the field of fiber optics, and more specifically to the selective excitation of predetermined modes within a multimode graded-index optical fiber.

2. Description of the Prior Art

It is known that selected modes of step-index optical fibers may be excited by directing a plane wave incident on the fiber end at an angle to the fiber axis. The mode excited is determined by control of the angle between the incident light beam and the fiber axis. This end-launch technique, when attempted with graded-index fibers, excites a spectrum of modes rather than a single one as is desired. This failure to achieve excitation of a single mode is documented for example by R. Olshansky, S. M. Oaks, and D. B. Keck, in Digest of Topical Meeting on Optical Fiber Transmission (Optical Society of America, Washington, D.C., 1977), paper TUE 5.

It is also known that selected "leaky" modes may be excited by directing a light beam through the side of a glass fiber, as taught for example by S. Zemon and D. Fellows, Applied Optics 15, 1936 (1976).

These leaky modes have propagation constants, $\beta = K \cos \phi$ smaller in value than $kn_{cladded}$, the minimum propagation constant for guided modes excited via the end launch technique. The leaky modes suffer high loss, however, because a major portion of the energy propagates outside the fiber core.

Light wave refraction affects only the wavenumber component perpendicular to the index boundary, which under end launch conditions corresponds to the axial component. The wavenumber component parallel to an index boundary is unaffected by the boundary. This implies that under a side launch arrangement where all index boundaries occur parallel to the fiber axis, the axial component of the source field will not be perturbed by the index variations either in a graded- or step-index fiber.

SUMMARY OF THE INVENTION

It is an object of this invention to provide a method of selective excitation of individual modes within a multimode graded-index optical fiber. It is a further object to provide an apparatus for selectively exciting individual modes within such a fiber.

It is a still further object to provide a side launch technique for such selective excitation.

An apparatus which achieves these and other useful results includes an optical fiber which has been etched below the cladding layer; a coupling medium having an index of refraction greater than that of the fiber cladding in contact with the tapered portion of the fiber; and a source of light directed toward the coupling medium such that the light beam passes through the medium into the fiber.

A method for exciting a selected mode in a graded-index optical fiber includes the steps of etching the fiber below the cladding layer and directing a beam of light into the fiber through the etched portion.

DESCRIPTION OF THE PREFERRED EMBODIMENT

The waveguiding properties of an optical fiber are conveniently described by a potential well model within the W.K.B. approximation. In this approximation, guidance occurs when the quantity $$U(r) = \left[ k^2 n^2(r) - \frac{\nu^2}{r^2} - \beta^2 \right]^{\frac{1}{2}}$$

satisfies the condition $$\mu\pi = \int_{R_1}^{R_2} U(r) dr$$

If $$\frac{\nu^2}{r^2} - k^2 n^2(r)$$

is considered a potential, then the theory describes guidance for propagation constant $\beta$ lying above the well bottom at A and below the edge of the well at point B. Those values of $\beta$ above the well edge at $\beta$ but below the lip of the well at C constitute leaky modes. The energy of these modes over moderate distances is dissipated through tunneling losses in this potential barrier at C.

Figure 3:
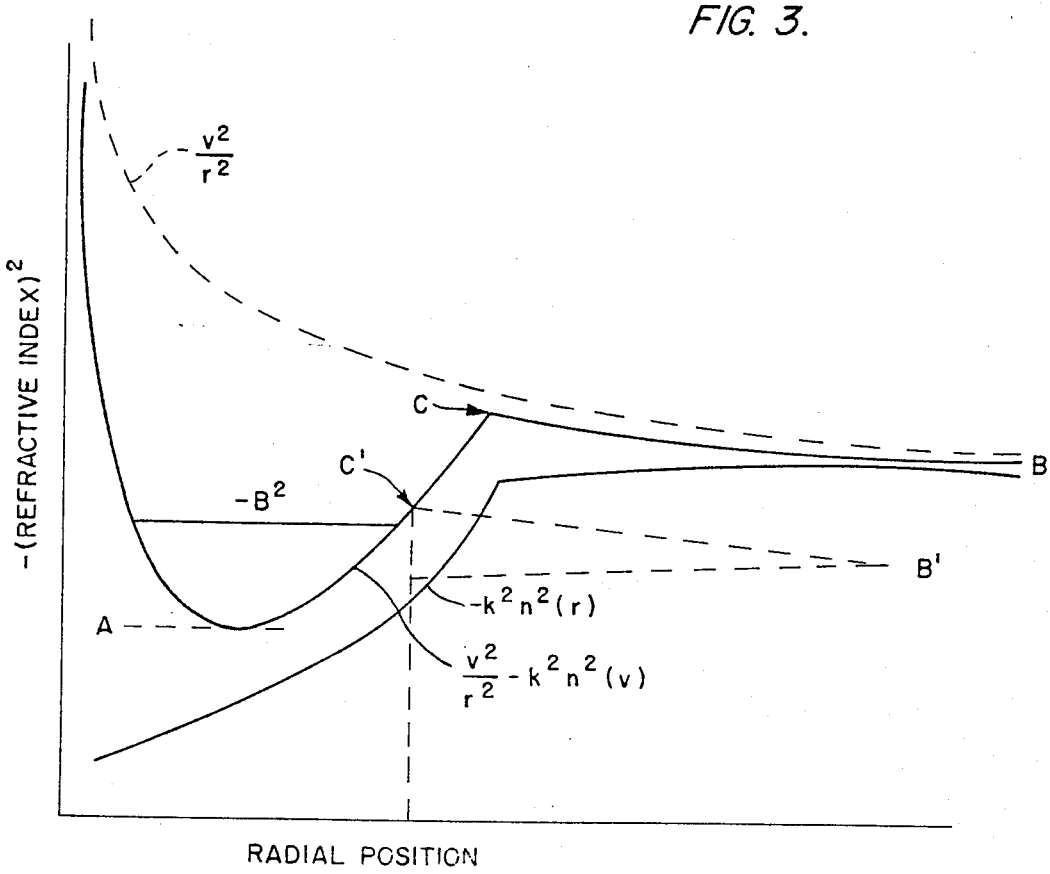
FIG. 3—is a graphical representation of a potential well for wave propagation in an optical fiber.

Our invention consists of perturbing the fiber index profile by etching the fiber cladding and part of the core in a tapered configuration. As indicated in FIG. 3, the effect of the etching at a particular point along the taper is a potential well of reduced height corresponding to the etched radius $r_1$. The lip of the well is reduced to $C'$ and the well edge is reduced to $\beta'$ corresponding to the refractive index of the coupling prism.

Because of the reduced edge of the perturbed well at $\beta'$ the previously propagating mode $\beta$ at this point in the fiber becomes a leaky mode which can be accessed by tunneling thru the side of the fiber. Coupling to this specific mode is accomplished by establishing a propagating wave within the prism which has a wave number component parallel to the fiber axis equal to $\beta$. As the wave propagates beyond the taper into the unetched region surrounded by the cladding, this wave becomes a guided wave.

Figure 1:
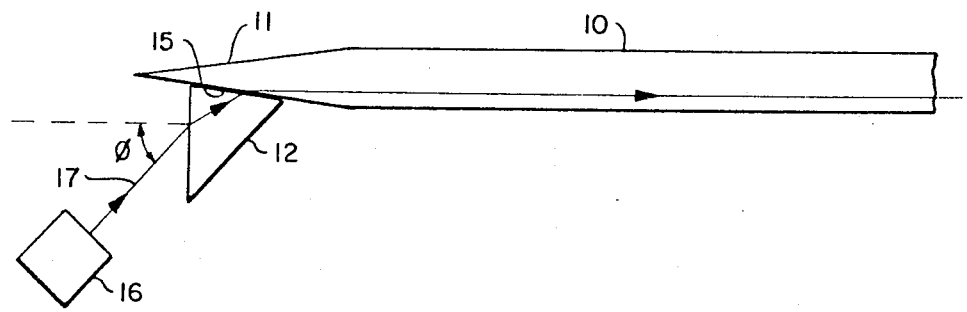
FIG. 1—illustrates an apparatus for selective mode excitation of a graded index optical fiber.

In the foregoing equations,
 k = freespace propagation constant = $2\pi/\lambda$
 n = refractive index, variable over the radius (r)
 $\nu$ = azimuthal quantum number
 $\mu$ = radial quantum number
 R = radial extent of the mode
 $\beta$ = propagation constant equal to $k \cos \phi$ where $\phi$ is the angle between $\beta$ and k Referring to FIG. 1, an optical fiber 10 is prepared by etching such that its diameter is linearly tapered to a minimum along a portion 11 of its length. A prism 12 is coupled to the fiber by positioning it in contact with the taper. Preferably, a thin glycerine film is added to the prism surface at the point of contact 15 to enhance the coupling efficiency by providing an approximate match of the indexes of refraction between the prism 12 and the fiber 10. A light source such as a laser 16 is positioned to direct a coherent beam of light 17 toward the prism 12 in a manner such that the angle of incidence $\phi$ of the beam may be precisely controlled.

As shown in FIG. 1, the fiber 10 lies in the plane of incidence of the source beam 17. Selection of the particular mode to be excited may be controlled by varying the angle of incidence $\phi$ of the source beam. Maximization of coupling efficiency is achieved by varying the beam position linearly along the taper.

Figure 2:
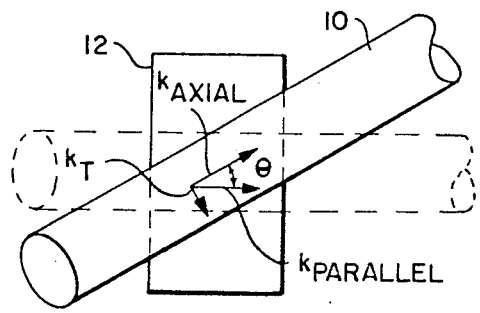
FIG. 2—is a top view of the fiber and prism of FIG. 1, with the fiber rotated an angle $\theta$ from the plane of incidence of the prism.

FIG. 2 illustrates a top view of the fiber 10 and the prism 12, with the fiber rotated through an angle $\theta$ with respect to the plane of incidence. This rotation provides the extra degree of freedom required to excite additional modes with azimuthal as well as radial symmetry.

For individual mode excitation the fiber 10 is tilted out of the plane of incidence of the source beam, as indicated in FIG. 2, resolving the wave number component $k_{parallel}$ into axial ($k_{axial}$) and tangential ($k_T$) components.

Under these conditions, preferential coupling is found to occur with the fiber mode having a propagation constant $\beta = k_{axial}$ and an azimuthal number $\nu = k_T/r_{peak}$ where $r_{peak}$ is the radial position of peak mode intensity.

While we have described the method and apparatus for launching a light wave into a selected mode of an optical fiber, the same technique is applicable for extracting the wave at the output end of the fiber.

We have described an apparatus and method by which selected modes may be excited in a graded-index optical fiber. While the above description sets forth a preferred embodiment, it is to be understood that our invention is limited only by the claims set forth below.

We claim:

1. An apparatus for exciting a selected mode in a graded-index optical fiber, comprising:
    a graded-index multimode optical fiber which has been etched to a taper below the cladding layer;
    a coupling medium having an index of refraction greater than that of the fiber cladding and contacting the tapered portion of the fiber; and
    a source of light directed toward the coupling medium such that the light beam passes through the medium into the fiber.

2. The apparatus of claim 1 wherein said coupling medium is a prism.

3. The apparatus of claim 2 wherein said light source is a coherent light source.

4. A method for exciting a selected mode in a graded-index optical fiber, comprising:
    etchng a graded-index multimode optical fiber to a taper below the cladding layer;
    directing a coherent beam of light into the fiber through the side of the etched portion, and
    adjusting the angle of incidence of said beam to excite a predetermined mode in said fiber.

5. The method of claim 4 wherein said directing includes directing a beam of light into a prism adjacent to said etched portion.

6. The method of claim 5 including the further step of adjusting the position of the prism along said taper to maximize coupling efficiency.

7. The method of claim 5 including the further step of varying the optical fiber angle with respect to the plane of incidence of the light beam to vary the mode.

* * * * *